No. 858,557. PATENTED JULY 2, 1907.
F. BANNING.
GUARD FOR SWINGING SHAFTS.
APPLICATION FILED JAN. 18, 1907.

Witnesses:

Inventor:
Felix Banning

UNITED STATES PATENT OFFICE.

FELIX BANNING, OF DÜREN-ON-THE-RHINE, GERMANY.

GUARD FOR SWINGING SHAFTS.

No. 858,557.　　　　Specification of Letters Patent.　　　　Patented July 2, 1907.

Application filed January 18, 1907. Serial No. 353,003.

*To all whom it may concern:*

Be it known that I, FELIX BANNING, a citizen of the German Empire, residing at Düren-on-the-Rhine, Germany, have invented new and useful Improvements in Guards for Swinging Shafts, of which the following is a specification.

The stuffing of shafts which execute only a partial rotation within certain limits (an alternating swinging to and fro) offers, as is well known, greater difficulties than the stuffing of rotating shafts, as the stuffing boxes used for the latter are not suited for swinging shafts, and always cause leakages. This is especially the case in paper mills for the swinging plate shaft of the pulp-strainer, in which the reservoir containing the material, which is crossed by the swinging plate shaft with two stuffing boxes can never be so perfectly tightened that the passing through of the liquid is impossible.

The present invention relates to a new stuffing device for swinging shafts which is absolutely tight and possesses, moreover, the advantage that losses caused by friction are entirely avoided. For the stuffing is effected by a hollow cone or hollow cylinder of a yielding material, which is fastened with one of its ends to the circumference of the swinging shaft and with its other end to the wall of the reservoir.

Figure 1:
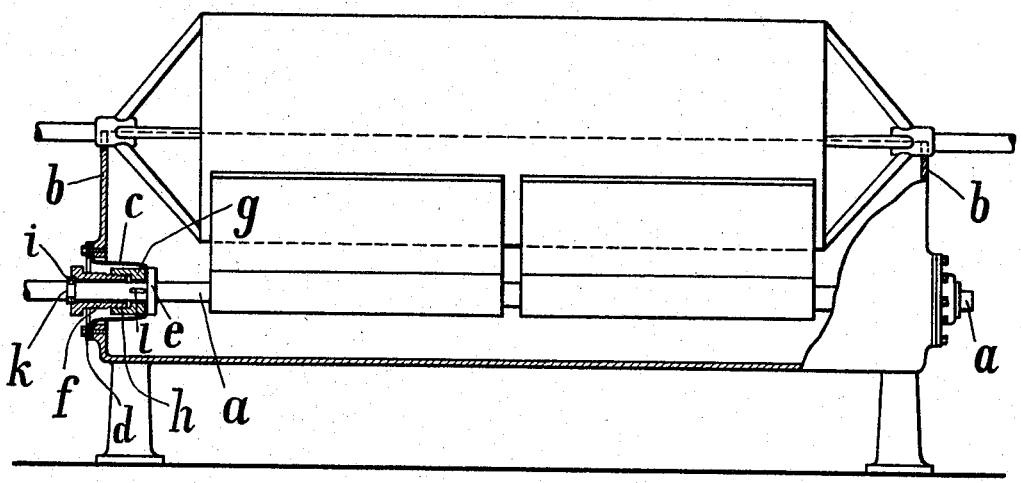
Figure 2:
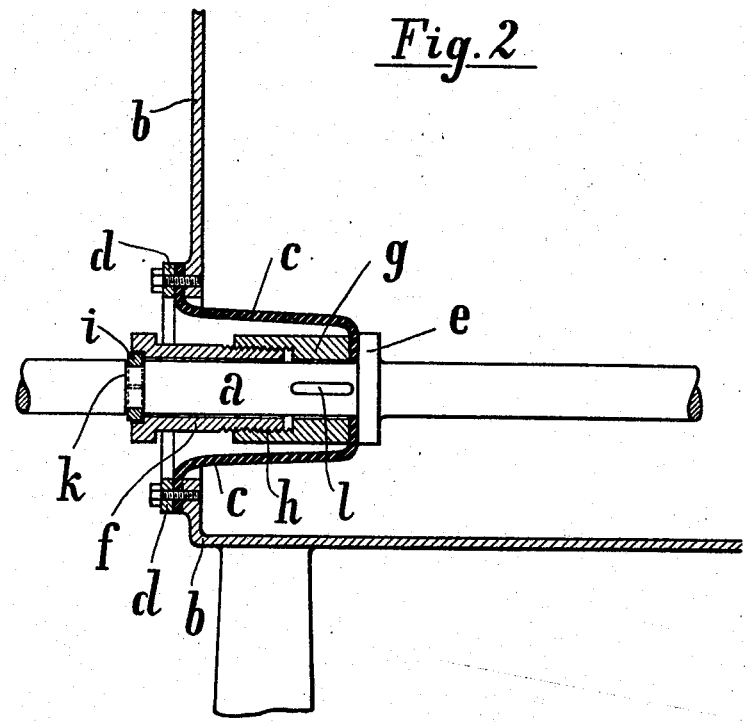

The invention is illustrated on the accompanying drawing, in which:

Figure 1 is a longitudinal section and Fig. 2 is an enlarged sectional view showing the invention.

In the place where the swinging shaft $a$ passes through the wall of the reservoir $b$ there is used instead of the usual stuffing box a hollow cone $c$ of a yielding material, for instance caoutchouc, or the like, which effects the stuffing between the shaft and the walls of the reservoir. In the construction shown in the drawing, the outer end of the hollow cone is fastened to the wall of the reservoir, by means of a ring $d$ and screws. The inner end of the hollow cone is fastened to the band $e$ on the shaft $a$. In order to press the inner end of the hollow cone against the band $e$, there are used the sleeves $f$ and $g$, which are movably arranged on the swinging shaft $a$, whose facing ends are screwed together by a thread $h$. The sleeve $f$ sets with its outer end against the two-part ring $i$ in the groove $k$ of the swinging shaft.

The inside sleeve $g$ is slidably arranged on the swinging shaft by means of a spring and a groove $l$, but cannot turn on the same. If therefore the sleeve $f$ is turned by means of a key, or the like, the sleeve $g$ is screwed slowly inwards and firmly presses the inner end of the hollow cone $c$ against the band $e$ of the swinging shaft. If now the shaft $a$ is swung to and fro, the elastic hollow cone $c$ yields and perfectly prevents liquid from passing through. Frictional losses are likewise entirely avoided by this mode of stuffing.

In order to clear or exchange the elastic hollow cone $c$, it is only necessary to screw back the sleeve $g$ by screwing backwards the sleeve $f$, and to unscrew the ring $d$, whereupon the elastic hollow cone can at once be removed.

What I claim as my invention and desire to secure by United States Letters Patent is:—

In combination with a frame, a swinging shaft therein, a guard of flexible material for said shaft, means for detachably securing one end of the guard to the frame, there being a collar on the shaft against which the other end of the guard bears, a sleeve slidably carried by the shaft and adapted to press the guard against the collar, a second sleeve rotatably carried by the shaft and having screw threaded connection with the first sleeve and a split collar on the shaft forming a stop for the outer end of the second sleeve.

In testimony whereof I have signed my name to this specification in the presence of two subscribing witnesses.

FELIX BANNING.

Witnesses:
　BESSIE F. DUNLAP,
　LOUIS VANDORY.